(12) United States Patent
Xia et al.

(10) Patent No.: US 12,524,884 B2
(45) Date of Patent: Jan. 13, 2026

(54) METHOD, APPARATUS, AND NON-TRANSITORY COMPUTER READABLE MEDIUM FOR TRAINING IMAGE PROCESSING MODEL

(71) Applicant: Alibaba (China) Co., Ltd., Hangzhou (CN)

(72) Inventors: Yingda Xia, North Bethesda, MD (US); Jiawen Yao, Beijing (CN); Dakai Jin, Laurel, MD (US); Xiansheng Hua, Zhejiang (CN); Le Lu, Bethesda, MD (US); Ling Zhang, Rockville, MD (US)

(73) Assignee: Alibaba (China) Co., Ltd., Hangzhou (CN)

( * ) Notice: Subject to any disclaimer, the term of this patent is extended or adjusted under 35 U.S.C. 154(b) by 545 days.

(21) Appl. No.: 18/046,397

(22) Filed: Oct. 13, 2022

(65) Prior Publication Data
US 2024/0005509 A1    Jan. 4, 2024

(30) Foreign Application Priority Data
May 24, 2022    (CN) .......................... 202210570705.1

(51) Int. Cl.
    *G06T 7/11*    (2017.01)
(52) U.S. Cl.
    CPC ...... *G06T 7/11* (2017.01); *G06T 2207/10081* (2013.01); *G06T 2207/20081* (2013.01); *G06T 2207/30028* (2013.01); *G06T 2207/30172* (2013.01)

(58) Field of Classification Search
    CPC ............. G06T 7/11; G06T 2207/10081; G06T 2207/20081; G06T 2207/30028; G06T 2207/30172; G06T 2207/10088; G06T 2207/20084; G06T 7/0012;
    (Continued)

(56) References Cited

U.S. PATENT DOCUMENTS

| 11,881,038 B2* | 1/2024 | Peng ......................... G06N 3/08 |
| 11,922,679 B2* | 3/2024 | Wang ................... G06N 3/0455 |
| 12,380,577 B1* | 8/2025 | Wu ......................... G06T 7/215 |

(Continued)

FOREIGN PATENT DOCUMENTS

| CN | 108335284 A | 7/2018 |
| CN | 113658702 A | 11/2021 |

(Continued)

OTHER PUBLICATIONS

Office Action issued in corresponding Chinese Application No. 202210570705.1 on Apr. 18, 2025, (6 pages).

*Primary Examiner* — Mia M Thomas
(74) *Attorney, Agent, or Firm* — Finnegan, Henderson, Farabow, Garrett & Dunner, LLP

(57) ABSTRACT

A method, an apparatus, and a non-transitory computer readable medium for training an image processing model are provided. The method includes: acquiring a sample image comprising a target object to determine an object segmentation image of the target object in the sample image; constructing an object coordinate map corresponding to the object segmentation image according to the object segmentation image; and training an image processing model comprising a self-attention mechanism layer according to the sample image, the object segmentation image, and the object coordinate map.

20 Claims, 6 Drawing Sheets

(58) Field of Classification Search
CPC .......... G06T 2207/30096; G06V 10/25; G06V 10/26; G06V 10/764; G06V 10/774; G06V 10/82
See application file for complete search history.

(56) References Cited

U.S. PATENT DOCUMENTS

| | | |
|---|---|---|
| 2019/0030371 A1* | 1/2019 | Han ..................... A61N 5/1039 |
| 2021/0157998 A1 | 5/2021 | Rodriguez et al. |
| 2021/0248392 A1* | 8/2021 | Zaheer ................ G06V 10/764 |
| 2021/0390410 A1* | 12/2021 | Vaswani ................. G06N 3/08 |
| 2022/0044068 A1* | 2/2022 | Chai ...................... H04N 23/10 |
| 2022/0044439 A1* | 2/2022 | Hou ........................... G06T 7/75 |
| 2022/0108478 A1* | 4/2022 | Houlsby ................. G06N 3/08 |
| 2022/0253639 A1* | 8/2022 | Fan ........................ G06N 3/045 |
| 2022/0319041 A1* | 10/2022 | Jiang .................... G02B 27/017 |
| 2022/0383630 A1* | 12/2022 | Beyer ................. G06V 10/7747 |
| 2022/0391639 A1* | 12/2022 | Gurumurthy ........... G06F 18/23 |
| 2023/0045882 A1* | 2/2023 | Yamamoto ........... G06V 10/267 |
| 2023/0086122 A1* | 3/2023 | Gombolay ........... G05B 19/401 700/186 |
| 2023/0298589 A1* | 9/2023 | Madan .................... G10L 15/22 704/9 |
| 2023/0305572 A1* | 9/2023 | Yang ..................... G05D 1/622 |
| 2023/0326173 A1* | 10/2023 | Chen ..................... G06V 10/44 |
| 2023/0368500 A1* | 11/2023 | Ma ......................... G06V 10/82 |
| 2024/0005507 A1* | 1/2024 | Yao .......................... G06T 7/11 |
| 2024/0095951 A1* | 3/2024 | Ramachandra .......... G06T 7/74 |
| 2024/0221362 A1* | 7/2024 | Kabra .................... G06N 3/047 |
| 2024/0257356 A1* | 8/2024 | Zhang .................... G16H 30/40 |

FOREIGN PATENT DOCUMENTS

| | | |
|---|---|---|
| WO | 2022027032 A1 | 2/2022 |
| WO | 2022048672 A1 | 3/2022 |

* cited by examiner

METHOD, APPARATUS, AND NON-TRANSITORY COMPUTER READABLE MEDIUM FOR TRAINING IMAGE PROCESSING MODEL

CROSS-REFERENCE TO RELATED APPLICATIONS

The disclosure claims the benefits of priority to Chinese Application No. 202210570705.1, filed May 24, 2022, which is incorporated herein by reference in its entirety.

TECHNICAL FIELD

The present disclosure generally relates to computer technologies, and more particularly, to a method for training an image processing model.

BACKGROUND

Colorectal cancer (CRC) is cancer with a high mortality rate. Early detection of curable CRC has great potential to reduce the mortality rate. Currently, CRC may be detected using magnetic resonance imaging (MRI) or computed tomography colonography (CTC). However, MRI is only used for staging colorectal cancer, and CTC is not widely used because of the time-consuming for bowel preparation and dilation, which may cause adverse reactions such as painful examination and vasovagal syncope.

Therefore, segmenting the colorectum and tumor successfully without bowel preparation has a wider application potential and wider impact.

SUMMARY OF THE DISCLOSURE

Embodiments of the present disclosure provide a method for training an image processing model. The method includes: acquiring a sample image comprising a target object, to determine an object segmentation image of the target object in the sample image; constructing an object coordinate map corresponding to the object segmentation image according to the object segmentation image; and training an image processing model comprising a self-attention mechanism layer according to the sample image, the object segmentation image, and the object coordinate map.

Embodiments of the present disclosure provide an apparatus for training an image processing model. The apparatus includes a memory configured to store instructions; and one or more processors configured to execute the instructions to cause the apparatus to perform acquiring a sample image comprising a target object, and determining an object segmentation image of the target object in the sample image; constructing an object coordinate map: corresponding to the object segmentation image according to the object segmentation image; and training an image processing model comprising a self-attention mechanism layer according to the sample image, the object segmentation image, and the object coordinate map.

Embodiments of the present disclosure provide a non-transitory computer-readable storage medium that stores a set of instructions that is executable by one or more processors of an apparatus to cause the apparatus to initiate a method for training an image processing model. The method includes: acquiring a sample image comprising a target object, and determining an object segmentation image of the target object in the sample image; constructing an object coordinate map corresponding to the object segmentation image according to the object segmentation image; and training an image processing model comprising a self-attention mechanism layer according to the sample image, the object segmentation image, and the object coordinate map.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
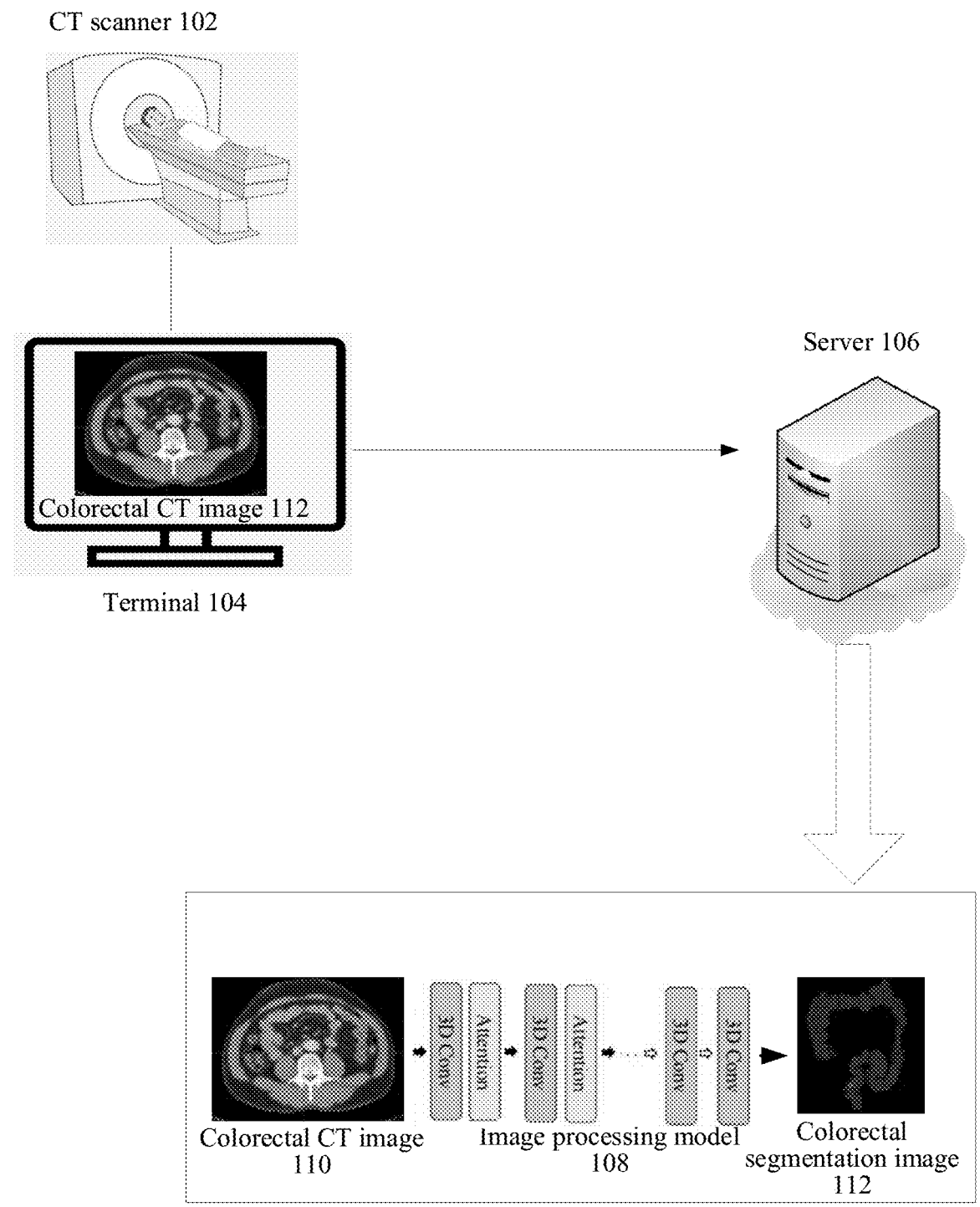
FIG. 1 is a schematic diagram of a specific scenario of a method for image processing applied to colorectal segmentation, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

CRC is cancer with a high mortality rate. CT provides position and morphological information of colorectal cancer, and is usually used for cancer detection, surgical planning, and treatment reaction monitoring and the structural evaluation of the entire colorectum. An automatic segmentation of colorectum, in particular, an automatic segmentation of CRC, is the key to implementing the automation of these clinical tasks, which can greatly improve the efficiency and the potential accuracy of the entire clinical working procedure.

The embodiments of the present disclosure are applicable to a data-aided scenario for CRC screening. One of the objectives of the present disclosure is to implement automatic segmentation of the colorectum (the colon and rectum) and CRC in a conventional abdominal CT scan (without bowel preparation), thereby improving the accuracy of segmentation results.

Compared with MRI, CT has a much lower cost for treating hollow tissue (for example, the colon), and CT is usually better than MRI. In clinical practice, MRI is mainly only used for staging rectal cancer. CTC is still not widely used because of the time-consuming for bowel preparation and dilation, which may sometimes cause adverse reactions such as examination-related pains and vasovagal syncope. Although CT is used in another CRC segmentation task, a barium coating is required for enhancement after bowel preparation. Therefore, the successful segmentation of the colorectum and tumor in an abdominal CT scan without bowel preparation has a wider application potential and wider impact.

In addition, the task is more challenging due to the following reasons: (i) The colorectum occupies a very large space in the abdomen, which is usually very difficult to be continuously tracked with the crowding of other organs such as the small intestine; (ii) In a conventional CT scan (without bowel preparation), CRCs are usually very small, making it difficult to distinguish from the content of the colorectum. CTC requires catharsis and colonic inflation to make the colon to fully expand, while pelvic MRI includes only the rectal structure. In addition, discontinuous segmentation of the colorectum may eventually affect the recognition accuracy in a data-aided scenario for CRC screening.

To resolve the foregoing technical problem, in a method for training an image processing model provided in the embodiments of the present disclosure, a deep colorectal coordinate conversion (DeepCRC) is provided to improve the accuracy of segmentation of colorectum and CRC. Topologically, the colorectum has one single-path and continuous structure between the cecum and the rectum. In view of this special mode, the present disclosure provides an auxiliary voxel-level regression solution to improve the continuity of segmentation. For example, a new one-dimensional coordinate system is established based on a centerline of the colon and rectum. Technically, each foreground colorectal voxel is projected into the one-dimensional coordinate system to convert a three-dimensional voxel space into a one-dimensional colorectal coordinate space, to obtain a normalized scalar of each voxel. In addition to voxel-level classification in a conventional segmentation task formula, in the solution, a coordinate value of a relative position in this coordinate system is further directly regressed. This auxiliary regression task makes an image processing model learn the global structure information of the colorectum and the position information of CRC, to assist the image processing model in implementing better segmentation performance.

The present disclosure provides a method for training an image processing model. One or more embodiments of the present disclosure simultaneously relate to an apparatus for training an image processing model, an method and an apparatus for image processing, a method and an apparatus for processing a colorectal CT image, a computing device, a computer-readable storage medium, and a computer program, which are described in detail in the following embodiments.

FIG. 1 is a schematic diagram of a specific scenario of a method for image processing applied to colorectal segmentation, according to some embodiments of the present disclosure.

FIG. 1 illustrates a CT scanner 102, a terminal 104, and a server 106.

During specific implementation, the CT scanner 102 performs a CT scan on a user that requires colorectal segmentation to acquire a colorectal CT image of the user. The terminal 104 acquires the colorectal CT image from the CT scanner 102, and sends the colorectal CT image 112 to the server 106. The server 106 inputs the colorectal CT image 110 into a pretrained image processing model 108, outputs a colorectal segmentation image 112 corresponding to the colorectal CT image 110, and returns the colorectal segmentation image 112 to the terminal 104. An operation user (for example, a doctor) of the terminal 104 may determine the colorectal status of the user according to the colorectal segmentation image 112, to determine whether the colorectum of the user is normal, benign, cancerous, or the like. The image processing model 108 may be understood as a deep learning model pretrained by combining a global self-attention mechanism and historical colorectal CT images.

In a specific scenario in which the image processing method provided in the embodiments of the present disclosure is applied to colorectal segmentation, a DeepCRC is provided, which is a colorectum and colorectal tumor segmentation framework in conventional enhanced CT. The DeepCRC is a topology awareness-based deep learning method, which is used for automatically segmenting colorectum and CRC in an abdominal CT scan. During the training of the image processing model, an additional auxiliary regression task is introduced to directly predict a relative position of each voxel in a colorectal topology and a self-attention layer to model the global context, thereby improving the accuracy of subsequent colorectal segmentation by the image processing model.

Figure 2:
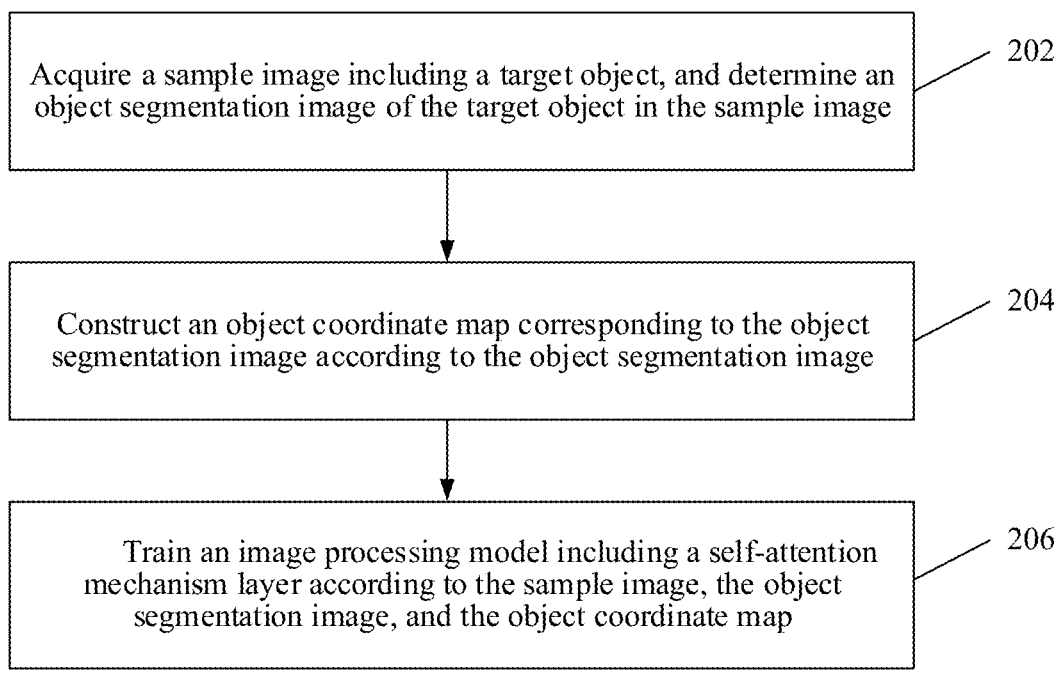
FIG. 2 is a flowchart of an exemplary method for training an image processing model, according to some embodiments of the present disclosure.

FIG. 2 is a flowchart of a method for training an image processing model, according to some embodiments of the present disclosure. The method may includes the steps 202 to 206.

At step 202, a sample image including a target object is acquired, and an object segmentation image of the target object in the sample image is determined.

Specifically, the image processing model may be applied to a scenario of colorectal segmentation or may be applied to another usable scenario, for example, a scenario similar to colorectal segmentation.

When specific application scenarios of the image processing model are different, the obtained sample images including a target object are different. For example, when the image processing model is applied to a scenario of colorectal segmentation, the sample image including a target object may be understood as a CT image including the colorectum. That is, the sample image including a target object is a CT image including the colorectum.

For ease of understanding, the following embodiments are described in detail by using an example in which the sample image including a target object is a CT image including the colorectum.

During actual application, a plurality of three-dimensional CT images of a CRC patient may be collected as sample images, and object segmentation images of each sample image are acquired. The object segmentation image is obtained after a professional segmentation by using some annotation tools. The three-dimensional CT images include normal colorectal images, benign CRC images, and CRC images. These CT images and the object segmentation images corresponding to each CT image form a training data set for subsequent model training. For example, the training data set is $S=\{(X_i, Y_i)|i=1, 2, \ldots, M\}$ where $X_i \in \mathbb{R}^{H_i \times W_i \times D_i}$ represents a colorectal CT image of an $i^{th}$ patient; $Y_i \in \mathcal{L}^{H_i \times W_i \times D_i}$ represents a label annotated in a voxel direction (i.e., an object segmentation image), and uses a same three-dimensional size ($H_i$, $W_i$, $D_i$) as $X_i$; $\mathcal{L}=\{0, 1, 2\}$ represents segmentation objects, which are respectively a background, a colorectum, and a colorectal cancer, that is, a set of labels, in which 0 represents the background, 1 represents the colorectum, and 2 represents the colorectal cancer.

Taking the sample image including a target object being a CT image including the colorectum for example, acquiring a sample image including a target object, and determining an object segmentation image of the target object in the sample image can be understood as acquiring a CT image including the colorectum, and determining an object segmentation image of the colorectum in each CT image.

At step 204, an object coordinate map corresponding to the object segmentation image is constructed according to the object segmentation image.

During actual application, in order to improve the continuity of image segmentation by the subsequently trained image processing model, a coordinate conversion manner is used in the embodiments of the present disclosure, thereby training the image processing model by using an auxiliary regression task. Specifically, a specific implementation of the coordinate conversion manner provided in the embodiments of the present disclosure is described as following: the constructing an object coordinate map corresponding to the object segmentation image according to the object segmentation image includes: extracting a sample centerline of the target object in the object segmentation image according to a preset centerline extraction algorithm; establishing an initial coordinate map according to the object segmentation image, and determining a start point position of the sample centerline; and tracking the sample centerline from the start point position according to a preset tracking algorithm, and constructing the object coordinate map corresponding to the object segmentation image by combining a foreground voxel in the object segmentation image and coordinates in the initial coordinate map.

The preset centerline extraction algorithm includes, but is not limited to, an $f_{cl}$ algorithm. The $f_{cl}$ is a formula symbol, where the subscript of f is cl, representing a centerline extraction algorithm.

Still taking the target object being the colorectum for example, further description to the conversion of an object coordinate map according to a colorectal CT image will be described below.

First, a centerline C of the colorectum is extracted from an actual object segmentation image Y according to the $f_{cl}$ algorithm, that is, $C=f_{cl}(Y)$, where $f_{cl}$ is a centerline extraction algorithm, C represents an extracted three-dimensional centerline image with the same size as a CT image X of the colorectum and an actual object segmentation image Y. Specifically, a robust centerline extraction algorithm is used in this solution, to avoid a pseudo-centerline generated due to irregular colorectal boundaries. The centerline C also ensures a three-dimensional centerline image with a single voxel thickness and having 26 connectivities. An automatic algorithm may fail to extract correct centerlines of some areas with severe ankylenteron. In the $f_{cl}$ algorithm in this solution, manual correction is added based on results of the foregoing automatic algorithm, which is more accurate than the automatic algorithm. These areas with severe ankylenteron in the actual object segmentation image Y can be erased, and the algorithm is run again to semi-automatically correct these centerlines.

Secondly, an initial coordinate map is established according to the object segmentation image, and a start point position of the sample centerline is determined. That is, an initial colorectal coordinate mapping image E is established according to the object segmentation image. E is initialized into one all-zero matrix with the same shape as the actual object segmentation image Y. The lowest foreground position j is then found on the centerline C. The lowest foreground position j is used as a start point position to implement subsequent tracking of the centerline C.

Finally, the centerline C is tracked from the start point position j according to a preset tracking algorithm, and the object coordinate map E corresponding to the object segmentation image is constructed by combining a foreground voxel in the object segmentation image and coordinates in the initial coordinate map. The foreground voxel may be understood as a voxel of the colorectum in the object segmentation image Y. In addition, in a process of tracking the centerline C, a coordinate value ranging from 0 to 1 is set for each tracked point.

During specific implementation, the tracking the sample centerline from the start point position according to a preset tracking algorithm, and constructing the object coordinate map corresponding to the object segmentation image by combining a foreground voxel in the object segmentation image and coordinates in the initial coordinate map includes: tracking the sample centerline from the start point position according to the preset tracking algorithm, and incrementally labeling the sample centerline in the initial coordinate map; propagating a coordinate position to the foreground voxel in the object segmentation image according to the sample centerline in the initial coordinate map; and mapping the corresponding foreground voxel into the initial coordinate map according to the coordinate position corresponding to the foreground voxel in the object segmentation image, and constructing the object coordinate map corresponding to the object segmentation image.

Specifically, the sample centerline is tracked from the start point position of the sample centerline according to a preset tracking algorithm to an end point position, and a point tracked in the sample centerline is incrementally labeled in the initial coordinate map during the tracking process. In addition, in the tracking process, a coordinate value ranging from 0 to 1 is set for each tracked point. In this case, a centerline may be determined in the initial coordinate map.

Then, a coordinate position is propagated to the foreground voxel in the object segmentation image according to the sample centerline in the initial coordinate map. That is, a coordinate value is propagated to the foreground voxel in the object segmentation image along the sample centerline. Finally, the foreground voxel is mapped into the initial coordinate map according to the coordinate position of the foreground voxel in the object segmentation image, and the object coordinate map corresponding to the object segmentation image is constructed.

Still using the foregoing example, the centerline is tracked by using a foreground position j as the start point position, and the centerline is incrementally labeled in E. In addition, a coordinate value ranging from 0 to 1 is set for each tracked position. Finally, the coordinate value is propagated to the foreground voxel in the object segmentation image Y along the centerline C. For each foreground position p, the closest point q is found on the centerline C, and coordinates of $E^p$ on the centerline C are updated to be the same as coordinates of q. Finally, the object segmentation image Y is converted into one object coordinate map E, that is, $E \in [0, 1]^{H \times W \times D}$.

During actual application, an input of colorectal coordinate conversion is $Y \in \mathcal{L}^{H \times W \times D}$, and an output is $E \in [0, 1]^{H \times W \times D}$. A specific implementation is described as follows.

At step 1, a centerline C is extracted according to the actual object segmentation image Y, the centerline being represented as $C = f_{cl}(Y)$. The centerline is a line having a thickness of one voxel and with 26 connectivities, that is, a line having a thickness of one 3D voxel and having 26 continuous connectivities in a 3D space.

At step 2, the lowest foreground position j is found on the centerline C.

At step 3, zero mapping E is initialized by using the object segmentation image Y with the same shape, and $E^j \leftarrow 1$ is performed.

At step 4: whether a point k that has not been accessed exists in the 26 adjacent domains of the position j is determined.

At step 5, $E^k \leftarrow E^j + 1$ is performed, that is, the centerline C is tracked and incrementally labeled.

At step 6, $j \leftarrow k$ is performed, representing a process of gradual iteration, and an adjacent point k is found, using the point k as a next reference point to continue with search.

At step 7, E is standardized to a [0, 1] coordinate system. This process is denoted by $$E \leftarrow \frac{E}{\max_i (E^i)}.$$

At step 8, each foreground voxel P of the actual object segmentation image Y is determined.

At step 9, a point q closest to each foreground voxel P is found on the centerline C.

At step 10, $E^p \leftarrow E^q$ is performed, that is coordinates of q is projected onto each foreground voxel P.

At step 11, E is returned as the object coordinate map.

In the embodiments of the present disclosure, according to an actual object segmentation image of a sample image, the actual object segmentation image is converted into an actual object coordinate map to convert a three-dimensional voxel space into a one-dimensional object coordinate space, to obtain a normalized scalar of each voxel. In addition to voxel-level classification in an original segmentation task, in this solution, a coordinate value of a relative position in the coordinate system is further directly regressed. Through this auxiliary task, a model not only can learn global structure information of features, but also learn position information, to assist the model in implementing better segmentation performance.

At step 206, an image processing model including a self-attention mechanism layer is trained according to the sample image, the object segmentation image, and the object coordinate map.

Specifically, after the object coordinate map corresponding to the object segmentation image is obtained, the image processing model including the self-attention mechanism layer may be trained according to the sample image, the object segmentation image, and the object coordinate map. A specific implementation is as follows.

The image processing model includes an encoder and a decoder. Correspondingly, the training an image processing model including a self-attention mechanism layer according to the sample image, the object segmentation image, and the object coordinate map includes: inputting the sample image into a convolutional layer of the encoder to obtain an initial sample feature map of the sample image; inputting the initial sample feature map into a self-attention mechanism layer of the encoder, and learning a feature relationship between each feature and another feature in the initial feature map, to obtain a target sample feature map corresponding to the initial sample feature map; inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

The sample image being a colorectal CT image is still taken for example. The colorectal CT image is inputted into a convolutional layer of an encoder to perform convolution to obtain an initial sample feature map of the colorectal CT image. The initial sample feature map is inputted into the self-attention mechanism layer of the encoder, to learn a feature relationship between each initial sample feature in the initial sample feature map and another sample feature. That is, for each initial sample feature in the initial sample feature map, a new feature is extracted according to all other global sample features, to allow each initial sample feature to have global knowledge. Target sample features after feature learning of each initial sample feature map are obtained. Finally, a target sample feature map is determined according to the target sample features.

Secondly, the target sample feature map is inputted into the decoder for processing, to obtain a predicted object segmentation image and a predicted object coordinate map of the target object in the sample image. Finally, the image processing model is trained according to the object segmentation image, the object coordinate map, the predicted object segmentation image, and the predicted object coordinate map in the colorectal CT image.

For the image processing model provided in the embodiments of the present disclosure, in terms of architectural improvement, a global self-attention mechanism layer is added to improve the capability of modeling global context of a model. An additional auxiliary regression task is generated in combination with the object coordinate map during model training to directly predict a topology of each voxel in the colorectum, thereby further improving the continuity of colorectal segmentation by the image processing model.

During actual application, to reduce the calculation amount of the self-attention mechanism layer, during the global context feature learning of the initial sample feature map in the self-attention mechanism layer, the initial sample feature map may be first down-sampled, and is then up-sampled during subsequent output through the self-attention mechanism layer. A specific implementation is as follows.

The inputting the initial sample feature map into a self-attention mechanism layer of the encoder, and learning a feature relationship between each feature and another feature in the initial feature map, to obtain a target sample feature map corresponding to the initial sample feature map includes: inputting the initial sample feature map into the self-attention mechanism layer of the encoder, and down-sampling the self-attention mechanism layer to obtain a down-sampled initial sample feature map; processing the down-sampled initial sample feature map through a multi-head self-attention mechanism in the self-attention mechanism layer, and learning a feature relationship between each feature and another feature in the down-sampled initial sample feature map, to obtain a candidate sample feature map; and up-sampling the candidate sample feature map, to obtain an up-sampled target sample feature map corresponding to the initial sample feature map.

The learning feature relationship between each feature and the other features in the initial sample feature map may be understood as extracting a new feature according to all other global sample features, to allow each initial sample feature to have global knowledge.

In addition, during actual practice, to improve the complexity of the image processing model and further improve the accuracy of subsequent use of the image processing model, a self-attention mechanism layer may be added after a plurality of convolutional layers.

Specifically, the self-attention mechanism layer is a global self-attention mechanism layer, and at least two global self-attention mechanism layers are provided and each of which is arranged after a corresponding convolutional layer of the encoder.

For example, the at least two self-attention mechanism layers include three self-attention mechanism layers. First, an initial sample feature map is inputted into a first self-attention mechanism layer of the encoder, and a target sample feature map corresponding to the initial sample feature map is obtained in the first self-attention mechanism layer according to the foregoing calculation manner. The target sample feature map is inputted into a subsequent convolutional layer to perform convolution to obtain a convoluted feature map, and the convoluted feature map is inputted into a next self-attention mechanism layer for operation, to output a corresponding target sample feature map. This process is iterated until a target sample feature map outputted by a last self-attention mechanism layer is obtained.

After the object segmentation image, the object coordinate map, the predicted object segmentation image, and the predicted object coordinate map are obtained, a first loss function and a second loss function may be obtained according to the object segmentation image, the object coordinate map, the predicted object segmentation image, and the predicted object coordinate map. The image processing model is trained according to the first loss function and the second loss function, thereby improving the accuracy of subsequent prediction of the image processing model. A specific implementation is as follows.

The training the image processing model according to the object segmentation image, the object coordinate map, the predicted object segmentation image, and the predicted object coordinate map includes: determining a first loss function formed according to the object segmentation image and the predicted object segmentation image; determining a second loss function formed according to the object coordinate map and the predicted object coordinate map; and training the image processing model according to the first loss function and the second loss function.

The determining a second loss function formed according to the object coordinate map and the predicted object coordinate map includes: obtaining the second loss function according to the object coordinate map and the predicted object coordinate map by using a first preset algorithm.

Specifically, for the first preset algorithm, reference may be made to Formula 1:

$$\mathcal{L}_{reg} = \sum_j \|P_c^j - E^j\|^2,$$

where $\mathcal{L}_{reg}$ represents the second loss function, j represents a $j^{th}$ voxel position of E, P represents each foreground voxel, C represents a centerline, and E represents the object coordinate map.

With the Formula 1, the predicted object coordinate map $P_c$ outputted by the model may be consistent with the object coordinate map E. By sharing the parameters, in subsequent application of the image processing model, the continuity of the object segmentation image predicted by using the image processing model may be improved. The calculated loss function may be used for optimizing model parameters of the image processing model.

In the embodiments of the present disclosure, after the predicted object coordinate map is obtained, the second loss function may be obtained according to the object coordinate map and the predicted object coordinate map by using the first preset algorithm. Subsequently, the model is adjusted by using the second loss function, so that the model can better learn a position relationship between features. Subsequently, during specific implementation of the image processing model, an image is segmented in consideration of the relationship between features, and the continuity of segmentation is ensured in the process of image segmentation in combination with a coordinate position relationship between features, thereby improving the segmentation accuracy of the image processing model.

After the first loss function and the second loss function are obtained, the target loss function may be obtained according to the first loss function and the second loss function, and an accurate training of the image processing model is implemented by using the target loss function. A specific implementation is as follows.

The training the image processing model according to the first loss function and the second loss function includes: obtaining a target loss function according to the first loss function and the second loss function by using a second preset algorithm; and training the image processing model according to the target loss function.

Specifically, for the second preset algorithm, reference may be made to Formula 2:

$$\mathcal{L} = \mathcal{L}_{seg} + \alpha \mathcal{L}_{reg},$$

where $\mathcal{L}_{seg}$ represents the first loss function, $\mathcal{L}_{reg}$ represents the second loss function, and α is a weight value of the two loss functions. For example, if α is set to 1, a ratio of the two loss functions is 1:1. If α is set to 0.1, the first loss function is 10 times the second loss function.

After the image processing model is obtained through training, in subsequent application, a to-be-processed image may be accurately segmented according to the image processing model, thereby obtaining an accurate object segmentation image. A specific implementation is as follows.

After the training an image processing model including a self-attention mechanism layer, the method further includes: receiving a to-be-processed image including a target object; and inputting the to-be-processed image into the image processing model, to obtain an object segmentation image of the target object in the to-be-processed image.

In the method for training an image processing model provided in the embodiments of the present disclosure, a new object coordinate map is constructed according to an object segmentation image. During the training of the image processing model, an image processing model is obtained through training by using a segmentation task generated by the object segmentation image and an auxiliary regression task generated by the object coordinate map in combination with a self-attention mechanism layer, thereby enhancing the architecture capability of modeling global context of the model and improving the accuracy of subsequently predicting a target object by the image processing model. The method is applicable to a data-aided scenario for CRC screening, thereby improving the accuracy of colorectal segmentation in a CT image by the image processing model.

Figure 3:
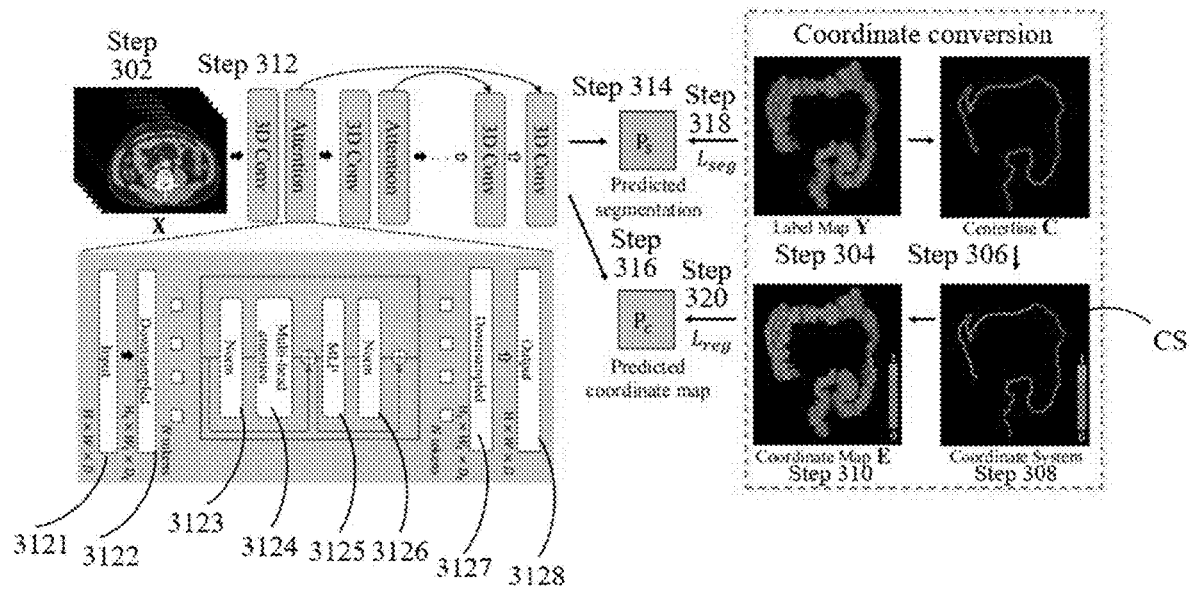
FIG. 3 is a flowchart illustrating a processing process of an exemplary method for training an image processing model, according to some embodiments of the present disclosure.

The method for training an image processing model is further described below with reference to FIG. 3 by using the application of the image processing method provided in the present disclosure to a scenario of colorectal segmentation as an example. FIG. 3 is a flowchart illustrating a processing process of an exemplary method for training an image processing model according to some embodiments of the present disclosure. The method specifically includes the steps 302 to 320.

At step 302, one or more colorectal CT images X of historical patients are acquired.

At step 304, a colorectal segmentation image Y of the colorectal CT image X is determined. For example, Label Map Y in FIG. 3 is determined.

Specifically, a training data set is formed according to the colorectal CT image and the colorectal segmentation image of each colorectal CT image, and the image processing model is trained by using the training data set.

At step 306, a centerline C of the colorectal segmentation image is extracted. For example, Centerline C in FIG. 3 is extracted.

At step 308, a colorectal coordinate mapping E is established, and the colorectal coordinate mapping E is initialized as one all-zero matrix with the same shape as Y. The lowest foreground position j is found on the centerline C. The position is used as a start point to track the centerline, and a centerline is incrementally labeled on E, to further performed normalization to a range of [0, 1].

Specifically, for the all-zero matrix with the same shape as Y, reference may be made to Coordinate System CS in FIG. 3.

At step 310, coordinates to a foreground voxel in Y are propagated along the centerline C, to obtain a colorectal coordinate map E corresponding to the colorectal segmentation image. For example, Coordinate Map E in FIG. 3 is obtained.

At step 312, the colorectal CT image (for example, a colorectal CT images X) is inputted into a convolutional layer of an encoder of the image processing model to obtain an initial feature map of the colorectal CT image, and input the initial feature map into a self-attention mechanism layer that is after the convolutional layer.

Specifically, after the initial feature map is inputted 3121 into the self-attention mechanism layer, after processing such as Down-sampled 3122, first normalization 3123, a multi-head self-attention mechanism 3124, a multilayer perceptron (MLP) 3125, second normalization 3126, and down-sampling 3127 in the self-attention mechanism layer, and a target feature map with the same size as the input is outputted 3128.

At step 314, the target feature map outputted by the self-attention mechanism layer is inputted into a decoder of the image processing model, to obtain a predicted colorectal segmentation image of the colorectal CT image $P_s$.

At step 316, the predicted colorectal coordinate map of the colorectal CT image $P_c$ is simultaneously obtained.

At step 318, the first loss function $\mathcal{L}_{seg}$ is obtained according to the predicted colorectal segmentation image (Predicted Segmentation) $P_s$ and the colorectal segmentation image Y.

At step 320, the second loss function $\mathcal{L}_{reg}$ is obtained according to the predicted colorectal coordinate map $P_c$ and the colorectal coordinate map E, and the image processing model is trained according to the first loss function $\mathcal{L}_{seg}$ and the second loss function $\mathcal{L}_{reg}$.

In the method for training an image processing model provided in the embodiments of the present disclosure, a DeepCRC is provided, which is a colorectum and colorectal tumor segmentation framework in conventional enhanced CT. An additional auxiliary regression task is introduced to directly predict a relative position of each voxel in a colorectal topology and a self-attention layer to model the global context. The experimental results show that when training is only performed on data of a small size (e.g., n<100), where n indicates the number of training data, the image processing model provided in the embodiments of the present disclosure is better than nnUNet (no-new-UNet) in terms of colorectal segmentation, has better integrity, and significantly improves the accuracy in tumor segmentation, thereby improving accuracy similar to that in the case that differences between observers are considered.

Specifically, the image processing model improves the integrity of colorectal prediction by using the DeepCRC, reliably predict topologies around a tumor area, and differentiate a tumor from organs and a background area. Assuming that a tumor affects the appearance of the colorectum, it makes more difficult to differentiate an affected area from a non-colorectal area. In the method in this solution, the topological knowledge is integrated into network embedding, and global context information is enhanced. This helps to improve the continuity of colorectal segmentation, thereby improving the accuracy of colorectal segmentation in a CT image.

Figure 4:
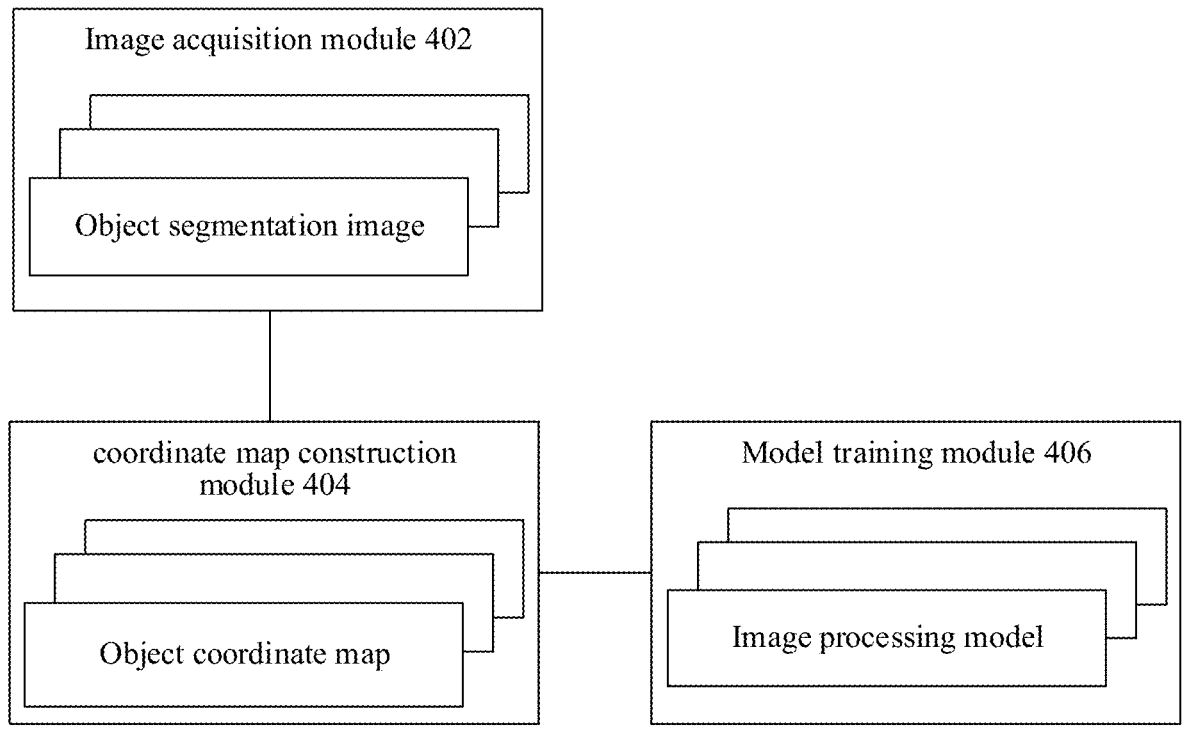
FIG. 4 is a schematic structural diagram of an exemplary apparatus for training an image processing model, according to some embodiments of the present disclosure.

Corresponding to the foregoing method embodiments, the present disclosure further provides some embodiments of an apparatus for training an image processing model. FIG. 4 is a schematic structural diagram of an exemplary apparatus for training an image processing model, according to some embodiments of the present disclosure. As shown in FIG. 4, the apparatus includes an image acquisition module 402, a coordinate map construction module 404, a model training module 406.

The image acquisition module 402 is configured to acquire a sample image including a target object, and determine an object segmentation image of the target object in the sample image.

The coordinate map construction module 404 is configured to construct an object coordinate map corresponding to the object segmentation image according to the object segmentation image.

The model training module 406 is configured to train an image processing model including a self-attention mechanism layer according to the sample image, the object segmentation image, and the object coordinate map.

In some embodiments, the coordinate map construction module 404 is further configured to: extract a sample centerline of the target object in the object segmentation image according to a preset centerline extraction algorithm; establish an initial coordinate map according to the object segmentation image, and determine a start point position of the sample centerline; and track the sample centerline from the start point position according to a preset tracking algorithm, and construct the object coordinate map corresponding to the object segmentation image by combining a foreground voxel in the object segmentation image and coordinates in the initial coordinate map.

In some embodiments, the coordinate map construction module 404 is further configured to: track the sample centerline from the start point position according to the preset tracking algorithm, and incrementally label the sample centerline in the initial coordinate map; propagate a coordinate position to the foreground voxel in the object segmentation image according to the sample centerline in the initial coordinate map; and map the corresponding foreground voxel into the initial coordinate map according to the coordinate position corresponding to the foreground voxel in the object segmentation image, and construct the object coordinate map corresponding to the object segmentation image.

In some embodiments, the image processing model includes an encoder and a decoder. Correspondingly, the model training module 406 is further configured to: input the sample image into a convolutional layer of the encoder to obtain an initial sample feature map of the sample image; input the initial sample feature map into a self-attention mechanism layer of the encoder, and learn a feature relationship between each feature and another feature in the initial feature map, to obtain a target sample feature map corresponding to the initial sample feature map; input the target sample feature map into the decoder for processing, to obtain a predicted object segmentation image and a predicted object coordinate map of the target object in the sample image; and train the image processing model according to the object segmentation image, the object coordinate map, the predicted object segmentation image, and the predicted object coordinate map.

In some embodiments, the model training module 406 is further configured to: determine a first loss function formed according to the object segmentation image and the predicted object segmentation image; determine a second loss function formed according to the object coordinate map and the predicted object coordinate map; and train the image processing model according to the first loss function and the second loss function.

In some embodiments, the model training module 406 is further configured to: input the initial sample feature map into the self-attention mechanism layer of the encoder, and down-sample the self-attention mechanism layer to obtain a down-sampled initial sample feature map; process the down-sampled initial sample feature map through a multi-head self-attention mechanism in the self-attention mechanism layer, and learn a feature relationship between each feature and another feature in the down-sampled initial sample feature map, to obtain a candidate sample feature map; and up-sample the candidate sample feature map, to obtain an up-sampled target sample feature map corresponding to the initial sample feature map.

In some embodiments, the model training module 406 is further configured to: obtain the second loss function according to the object coordinate map and the predicted object coordinate map by using a first preset algorithm.

In some embodiments, the model training module 406 is further configured to: obtain a target loss function according to the first loss function and the second loss function by using a second preset algorithm; and train the image processing model according to the target loss function.

In some embodiments, the apparatus further includes a model processing module. The model processing module is configured to: receive a to-be-processed image including a target object; and input the to-be-processed image into the image processing model, to obtain an object segmentation image of the target object in the to-be-processed image.

In some embodiments, the self-attention mechanism layer is a global self-attention mechanism layer, and at least two global self-attention mechanism layers are provided and are both arranged after the convolutional layer of the encoder.

In some embodiments, the sample image including a target object is a CT image including the colorectum.

In the apparatus for training an image processing model provided in the embodiments of the present disclosure, a new object coordinate map is constructed according to an object segmentation image. During the training of the image processing model, an image processing model is obtained through training by using a segmentation task generated by the object segmentation image and an auxiliary regression task generated by the object coordinate map in combination with a self-attention mechanism layer, thereby enhancing the architecture capability of modeling global context of the model and improving the accuracy of subsequently predicting a target object by the image processing model. The apparatus is applicable to a data-aided scenario for CRC screening, thereby improving the accuracy of colorectal segmentation in a CT image by the image processing model.

The foregoing example is a schematic solution of the apparatus for training an image processing model in the embodiments. It needs to be noted that the technical solution of the apparatus for training an image processing model belongs to the same conception as the technical solution of the foregoing method for training an image processing model. For details not described in detail in the technical solution of the apparatus for training an image processing model, reference may be made to the description of the technical solution of the foregoing method for training an image processing model.

Figure 5:
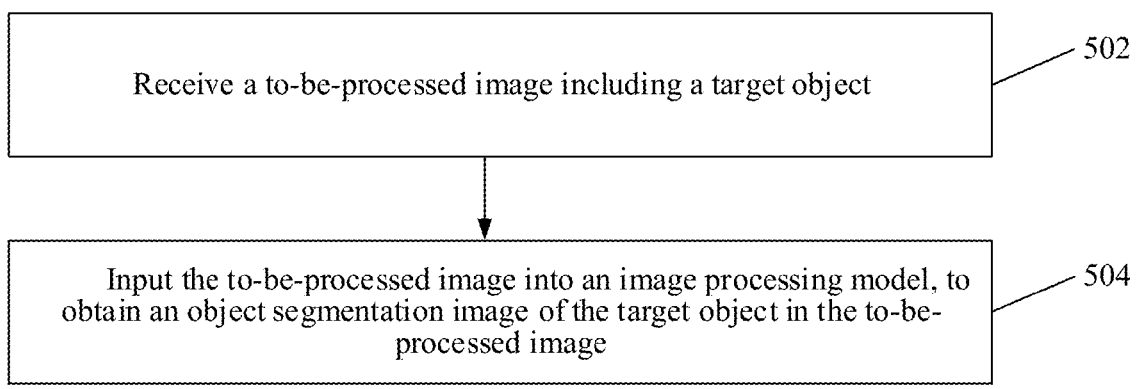
FIG. 5 is a flowchart of a processing process of another exemplary method for image processing, according to some embodiments of the present disclosure.

FIG. 5 is a flowchart of a processing process of an exemplary method for image processing according to some embodiments of the present disclosure. The method specifically includes the steps 502 and 504.

At step 502, a to-be-processed image including a target object is received.

At step 504, the to-be-processed image is inputted into an image processing model, to obtain an object segmentation image of the target object in the to-be-processed image, where the image processing model is obtained through training using the above-described method for training an image processing model.

In the image processing method provided in the embodiments of the present disclosure, after a to-be-processed image is received, an object segmentation image of a target object in the to-be-processed image can be accurately obtained according to a pretrained image processing model, thereby greatly improving the segmentation efficiency and use experience.

The foregoing solution is a schematic solution of an image processing method in the embodiments. It needs to be noted that the technical solution of the image processing method belongs to the same conception as the technical solution of the foregoing method for training an image processing model. For details not described in detail in the technical solution of the image processing method, reference may be made to the description of the technical solution of the foregoing method for training an image processing model.

Figure 6:
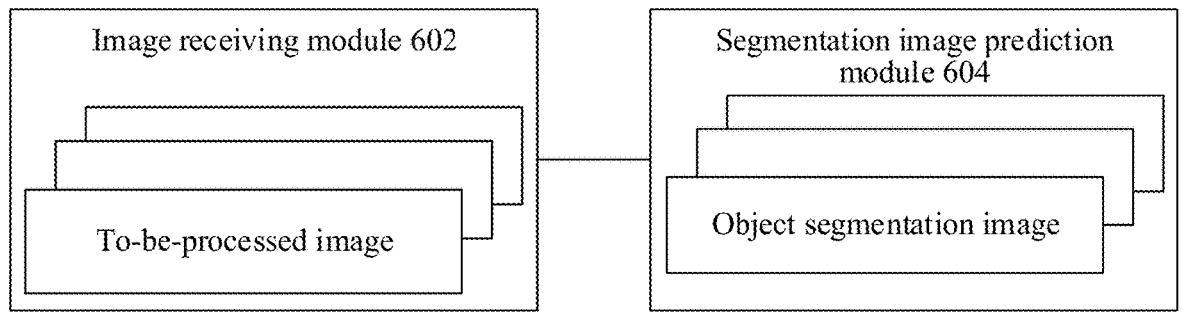
FIG. 6 is a schematic structural diagram of an exemplary apparatus for image processing, according to some embodiments of the present disclosure.

Corresponding to the foregoing method embodiments, the present disclosure further provides some embodiments of an image processing apparatus. FIG. 6 is a schematic structural diagram of an exemplary apparatus for image processing, according to some embodiments of the present disclosure. As shown in FIG. 6, the apparatus includes an image receiving module 602 and a segmentation image prediction module 604.

The image receiving module 602 is configured to receive a to-be-processed image including a target object.

The segmentation image prediction module 604 is configured to input the to-be-processed image into an image processing model, to obtain an object segmentation image of the target object in the to-be-processed image, where the image processing model is obtained through training using the above-described method for training an image processing model.

In the image processing apparatus provided in the embodiments of the present disclosure, after a to-be-processed image is received, an object segmentation image of a target object in the to-be-processed image can be accurately obtained according to a pretrained image processing model, thereby greatly improving the segmentation efficiency and use experience.

The foregoing solution is a schematic solution of an image processing apparatus in this embodiment. It needs to be noted that the technical solution of the image processing apparatus belongs to the same conception as the technical solution of the foregoing image processing method. For details not described in detail in the technical solution of the image processing apparatus, reference may be made to the description of the technical solution of the foregoing image processing method.

Figure 7:
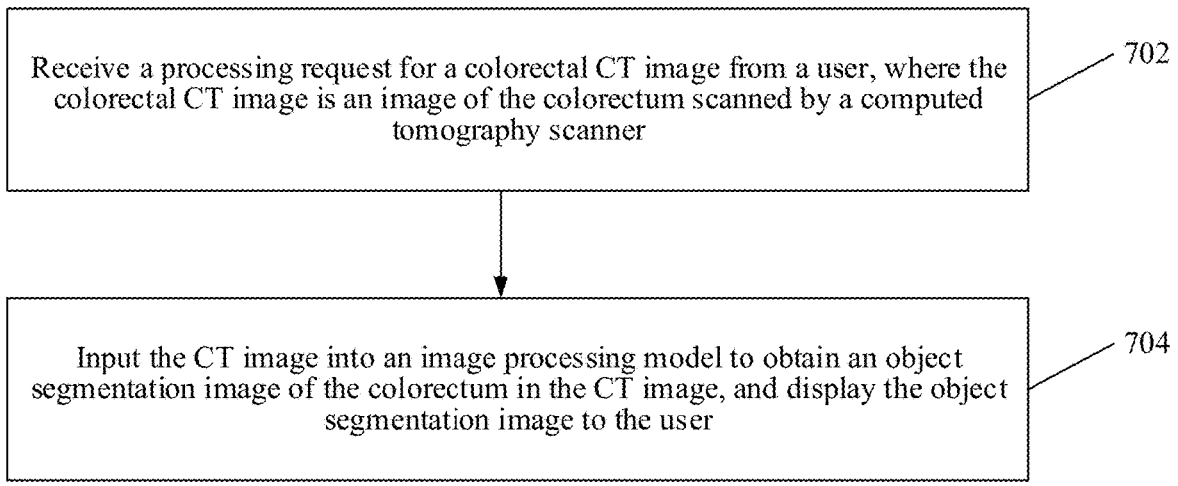
FIG. 7 is a flowchart of a processing process of an exemplary method for processing a colorectal CT image, according to some embodiments of the present disclosure.

FIG. 7 is a flowchart of a processing process of an exemplary method for, processing a colorectal CT image, according to some embodiments of the present disclosure. The method includes the steps 702 and 704.

At step 702, a processing request for a colorectal CT image from a user is received, where the colorectal CT image is an image of the colorectum scanned by a CT scanner.

At step 704, the CT image is inputted into an image processing model to obtain an object segmentation image of the colorectum in the CT image, and display the object segmentation image to the user.

The image processing model is a model obtained through training using the foregoing method for training an image processing model.

In the method for processing a colorectal CT image provided in the embodiments of the present disclosure, after a processing request for a colorectal CT image from a user is received, the colorectal CT image may be inputted into an image processing model to obtain an accurate colorectal segmentation image, so that subsequently the method can be applied to a data-aided scenario for CRC screening, thereby improving the screening efficiency.

The foregoing solution is a schematic solution of a method for processing a colorectal CT image in this embodiment. It needs to be noted that the technical solution of the method for processing a colorectal CT image belongs to the same conception as the technical solution of the foregoing method for training an image processing model. For details not described in detail in the technical solution of the method for processing a colorectal CT image, reference may be made to the description of the technical solution of the foregoing method for training an image processing model.

Figure 8:
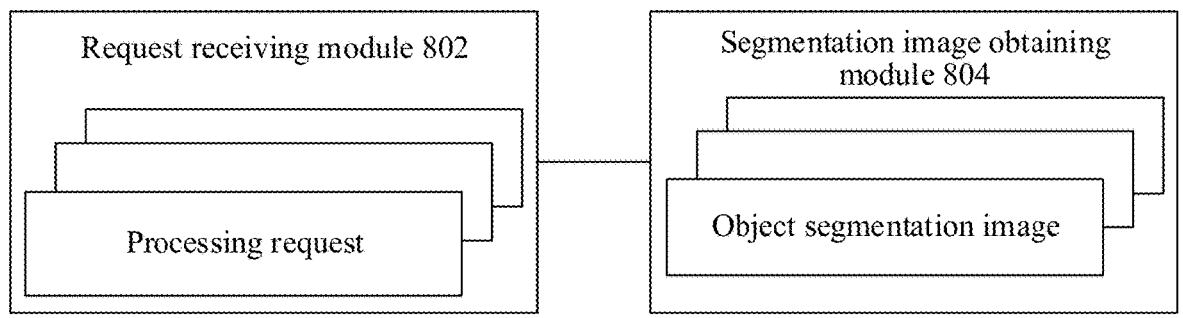
FIG. 8 is a schematic structural diagram of an exemplary apparatus for processing a colorectal CT image, according to some embodiments of the present disclosure.

Corresponding to the above-described method embodiments, the present disclosure further provides some embodiments of an apparatus for processing a colorectal CT image. FIG. 8 is a schematic structural diagram of an exemplary apparatus for processing a colorectal CT image, according to some embodiments of the present disclosure. As shown in FIG. 8, the apparatus includes a request receiving module 802 and a segmentation image obtaining module 804.

The request receiving module 802 is configured to receive a processing request for a colorectal CT image from a user, where the colorectal CT image is an image of the colorectum scanned by a CT scanner.

The segmentation image obtaining module 804 is configured to input the CT image into an image processing model to obtain an object segmentation image of the colorectum in the CT image, and display the object segmentation image to the user, where the image processing model is a model obtained through training using the foregoing method for training an image processing model.

In the apparatus for processing a colorectal CT image provided in the embodiments of the present disclosure, after a processing request for a colorectal CT image from a user is received, the colorectal CT image may be inputted into an image processing model to obtain an accurate colorectal segmentation image, so that subsequently the method can be applied to a data-aided scenario for CRC screening, thereby improving the screening efficiency.

The foregoing solution is a schematic solution of an apparatus for processing a colorectal CT image in this embodiment. It needs to be noted that the technical solution of the apparatus for processing a colorectal CT image belongs to the same conception as the technical solution of the foregoing method for processing a colorectal CT image. For details not described in detail in the technical solution of the apparatus for processing a colorectal CT image, reference may be made to the description of the technical solution of the foregoing method for processing a colorectal CT image.

Figure 9:
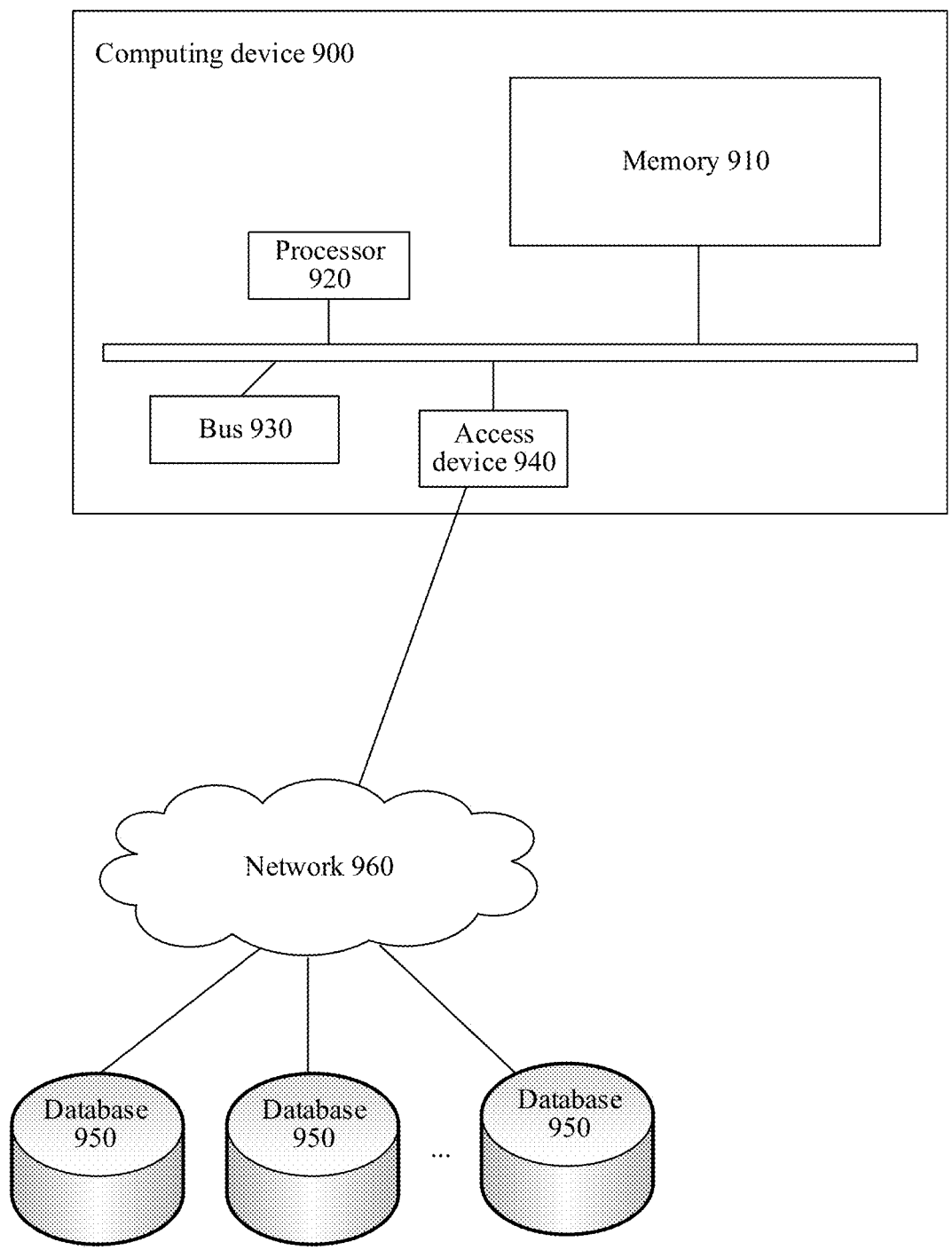
FIG. 9 is a structural block diagram of an exemplary computing device, according to some embodiments of the present disclosure.

FIG. 9 is a structural block diagram of an exemplary computing device 900, according to some embodiments of the present disclosure. Components of the computing device 900 include, but are not limited to, a memory 910 and a processor 920. The processor 920 is connected to the memory 910 by a bus 930. A database 950 is configured to store data.

The computing device 900 further includes an access device 940. The access device 940 allows the computing device 900 to perform communication via one or more networks 960. Examples of these networks include a public switched telephone network (PSTN), a local area network (LAN), a wide area network (WAN), a personal area network (PAN) or a combination of communication networks such as the internet. The access device 940 may include one or more of a wired or wireless network interface (for example, a network interface card (NIC)) of any type, for example, an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, or a near field communication (NFC) interface.

In some embodiments of the present disclosure, the above-described components of the computing device 900 and other components shown in FIG. 9 may be connected to each other, for example, by a bus. It should be understood that the structural block diagram of the computing device shown in FIG. 9 is merely exemplary, and is not intended to limit the scope of the present disclosure. A person skilled in the art may add or replace other components according to a requirement.

The computing device 900 may be a stationary or mobile computing device of any type, including a mobile computer, a mobile computing device (for example, a tablet computer, a person digital assistant, a laptop computer, a notebook, or a netbook), a mobile phone (for example, a smartphone), a wearable computing device (for example, a smartwatch or smart glasses), a mobile device of another type, or a stationary computing device such as a desktop computer or a personal computer (PC). The computing device 900 may alternatively be a mobile or stationary server.

The processor 920 is configured to execute the following computer-executable instructions, and the computer-executable instructions, when being executed by the processor, implement the steps of the above-described method image processing, method for training an image processing model or method for processing a colorectal CT image.

The foregoing example is a schematic solution of a computing device in this embodiment. It needs to be noted that the technical solution of the computing device belongs to the same conception as the technical solution of the foregoing image processing method, method for training an image processing model or method for processing a colorectal CT image. For details not described in detail in the technical solution of the computing device, reference may be made to the description of the technical solution of the foregoing image processing method, method for training an image processing model or method for processing a colorectal CT image.

Some embodiments of the present disclosure further provide a computer-readable storage medium, storing computer-executable instructions, where the computer-executable instructions, when being executed by a processor, implement the steps of the above-described method for image processing, method for training an image processing model or method for processing a colorectal CT image.

The foregoing example is a schematic solution of a computer-readable storage medium in this embodiment. It needs to be noted that the technical solution of the storage medium belongs to the same conception as the technical solution of the above-described method for image processing, method for training an image processing model or method for processing a colorectal CT image. For details not described in detail in the technical solution of the storage medium, reference may be made to the description of the technical solution of the foregoing image processing method, method for training an image processing model or method for processing a colorectal CT image.

Some embodiments of the present disclosure further provide a computer program is provided, where the computer program, when being executed in a computer, causes the computer to implement the steps of the foregoing image processing method, method for training an image processing model or method for processing a colorectal CT image.

The foregoing example is a schematic solution of a computer program in this embodiment. It needs to be noted that the technical solution of the computer program belongs to the same conception as the technical solution of the foregoing image processing method, method for training an image processing model or method for processing a colorectal CT image. For details not described in detail in the technical solution of the computer program, reference may be made to the description of the technical solution of the foregoing image processing method, method for training an image processing model or method for processing a colorectal CT image.

The embodiments may further be described using the following clauses:

1. A method for training an image processing model, comprising:

acquiring a sample image comprising a target object to determine an object segmentation image of the target object in the sample image;

constructing an object coordinate map corresponding to the object segmentation image according to the object segmentation image; and training an image processing model comprising a self-attention mechanism layer according to the sample image, the object segmentation image, and the object coordinate map.

2. The method according to clause 1, wherein constructing the object coordinate map corresponding to the object segmentation image according to the object segmentation image further comprises:

extracting a sample centerline of the target object in the object segmentation image according to a preset centerline extraction algorithm;

establishing an initial coordinate map according to the object segmentation image, and determining a start point position of the sample centerline;

tracking the sample centerline from the start point position according to a preset tracking algorithm; and constructing the object coordinate map corresponding to the object segmentation image by combining a foreground voxel in the object segmentation image and coordinates in the initial coordinate map.

3. The method according to clause 2, wherein tracking the sample centerline from the start point position according to the preset tracking algorithm, and constructing the object coordinate map corresponding to the object segmentation image by combining the foreground voxel in the object segmentation image and coordinates in the initial coordinate map further comprises:

tracking the sample centerline from the start point position according to the preset tracking algorithm, and incrementally labeling the sample centerline in the initial coordinate map;

propagating a coordinate position to the foreground voxel in the object segmentation image according to the sample centerline in the initial coordinate map; and mapping the corresponding foreground voxel into the initial coordinate map according to the coordinate position corresponding to the foreground voxel in the object segmentation image, and constructing the object coordinate map corresponding to the object segmentation image.

4. The method according to anyone of clauses 1 to 3, wherein the image processing model comprises an encoder and a decoder; and training an image processing model comprising the self-attention mechanism layer according to the sample image, the object segmentation image, and the object coordinate map further comprises:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

5. The method according to clause 4, wherein training the image processing model according to the object segmentation image, the object coordinate map, the predicted object segmentation image, and the predicted object coordinate map further comprises:
determining a first loss function formed according to the object segmentation image and the predicted object segmentation image;
determining a second loss function formed according to the object coordinate map and the predicted object coordinate map; and
training the image processing model according to the first loss function and the second loss function.

6. The method according to clause 4 or 5, wherein inputting the initial sample feature map into the self-attention mechanism layer of the encoder, and learning the feature relationship between each feature and another feature in the initial feature map, to obtain the target sample feature map corresponding to the initial sample feature map further comprises:
inputting the initial sample feature map into the self-attention mechanism layer of the encoder, and down-sampling the self-attention mechanism layer to obtain a down-sampled initial sample feature map;
processing the down-sampled initial sample feature map through a multi-head self-attention mechanism in the self-attention mechanism layer, and learning a feature relationship between each feature and other features in the down-sampled initial sample feature map, to obtain a candidate sample feature map; and
up-sampling the candidate sample feature map, to obtain an up-sampled target sample feature map corresponding to the initial sample feature map.

7. The method according to clause 5, wherein determining the second loss function formed according to the object coordinate map and the predicted object coordinate map comprises:
obtaining the second loss function according to the object coordinate map and the predicted object coordinate map by using a first preset algorithm.

8. The method according to clause 7, wherein training the image processing model according to the first loss function and the second loss function comprises:
obtaining a target loss function according to the first loss function and the second loss function by using a second preset algorithm; and training the image processing model according to the target loss function.

9. The method according to any one of clauses 1 to 8, wherein after training the image processing model comprising the self-attention mechanism layer, the method further comprises:
receiving a to-be-processed image comprising the target object; and
inputting the to-be-processed image into the image processing model, to obtain an object segmentation image of the target object in the to-be-processed image.

10. The method according to anyone of clauses 4 to 9, wherein the self-attention mechanism layer is a global self-attention mechanism layer, and at least two global self-attention mechanism layers are provided and each of the global self-attention mechanism layers is arranged after a corresponding convolutional layer of the encoder.

11. The method according to any one of clauses 1 to 10, wherein the to-be-processed image comprising the target object is a computed tomography (CT) image comprising colorectum.

12. An apparatus for training an image processing model, the apparatus comprising:
a memory configured to store instructions; and
one or more processors configured to execute the instructions to cause the apparatus to perform:
acquiring a sample image comprising a target object to determine an object segmentation image of the target object in the sample image;
constructing an object coordinate map corresponding to the object segmentation image according to the object segmentation image; and
training an image processing model comprising a self-attention mechanism layer according to the sample image, the object segmentation image, and the object coordinate map.

13. The apparatus according to clause 12, wherein in constructing the object coordinate map corresponding to the object segmentation image according to the object segmentation image, the one or more processors are further configured to execute the instructions to cause the apparatus to perform:
extracting a sample centerline of the target object in the object segmentation image according to a preset centerline extraction algorithm;
establishing an initial coordinate map according to the object segmentation image, and determining a start point position of the sample centerline;
tracking the sample centerline from the start point position according to a preset tracking algorithm; and
constructing the object coordinate map corresponding to the object segmentation image by combining a foreground voxel in the object segmentation image and coordinates in the initial coordinate map.

14. The apparatus according to clause 13, wherein in tracking the sample centerline from the start point position according to the preset tracking algorithm, and constructing the object coordinate map corresponding to the object segmentation image by combining the foreground voxel in the object segmentation image and coordinates in the initial coordinate map, the one or more processors are further configured to execute the instructions to cause the apparatus to perform:
tracking the sample centerline from the start point position according to the preset tracking algorithm, and incrementally labeling the sample centerline in the initial coordinate map;
propagating a coordinate position to the foreground voxel in the object segmentation image according to the sample centerline in the initial coordinate map; and
mapping the corresponding foreground voxel into the initial coordinate map according to the coordinate position corresponding to the foreground voxel in the object segmentation image, and constructing the object coordinate map corresponding to the object segmentation image.

15. The apparatus according to any one of clauses 12 to 14, wherein the image processing model comprises an encoder and a decoder, and in training an image processing model comprising the self-attention mechanism layer according to the sample image, the object segmentation image, and the object coordinate map, the one or more processors are further configured to execute the instructions to cause the apparatus to perform:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

16. The apparatus according to clause 15, wherein in training the image processing model according to the object segmentation image, the object coordinate map, the predicted object segmentation image, and the predicted object coordinate map, the one or more processors are further configured to execute the instructions to cause the apparatus to perform:

determining a first loss function formed according to the object segmentation image and the predicted object segmentation image;

determining a second loss function formed according to the object coordinate map and the predicted object coordinate map; and training the image processing model according to the first loss function and the second loss function.

17. A non-transitory computer readable medium that stores a set of instructions that is executable by one or more processors of an apparatus to cause the apparatus to initiate a method for training an image processing model, the method comprising:

acquiring a sample image comprising a target object to determine an object segmentation image of the target object in the sample image;

constructing an object coordinate map corresponding to the object segmentation image according to the object segmentation image; and training an image processing model comprising a self-attention mechanism layer according to the sample image, the object segmentation image, and the object coordinate map.

18. The non-transitory computer readable medium of clause 17, wherein constructing the object coordinate map corresponding to the object segmentation image according to the object segmentation image comprises:

extracting a sample centerline of the target object in the object segmentation image according to a preset centerline extraction algorithm;

establishing an initial coordinate map according to the object segmentation image, and determining a start point position of the sample centerline;

tracking the sample centerline from the start point position according to a preset tracking algorithm; and constructing the object coordinate map corresponding to the object segmentation image by combining a foreground voxel in the object segmentation image and coordinates in the initial coordinate map.

19. The non-transitory computer readable medium of clause 18, wherein tracking the sample centerline from the start point position according to the preset tracking algorithm, and constructing the object coordinate map corresponding to the object segmentation image by combining the foreground voxel in the object segmentation image and coordinates in the initial coordinate map comprises:

tracking the sample centerline from the start point position according to the preset tracking algorithm, and incrementally labeling the sample centerline in the initial coordinate map;

propagating a coordinate position to the foreground voxel in the object segmentation image according to the sample centerline in the initial coordinate map; and mapping the corresponding foreground voxel into the initial coordinate map according to the coordinate position corresponding to the foreground voxel in the object segmentation image, and constructing the object coordinate map corresponding to the object segmentation image.

20. The non-transitory computer readable medium of anyone of clauses 17 to 19, wherein the image processing model comprises an encoder and a decoder; and training the image processing model comprising a self-attention mechanism layer according to the sample image, the object segmentation image, and the object coordinate map comprises:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

21. An image processing method, comprising:

receiving a to-be-processed image comprising a target object; and inputting the to-be-processed image into an image processing model, to obtain an object segmentation image of the target object in the to-be-processed image, wherein the image processing model is obtained through training by a method for training the image processing model, the method for training the image process model comprises:

acquiring a sample image comprising a target object, and determining an object segmentation image of the target object in the sample image;

constructing an object coordinate map corresponding to the object segmentation image according to the object segmentation image; and training the image processing model comprising a self-attention mechanism layer according to the sample image, the object segmentation image, and the object coordinate map.

22. The method according to clause 21, before receiving the to-be-processed image comprising a target object, the method comprises:
receiving a processing request for a colorectal computed tomography (CT) image from a user; and after the object segmentation image is obtained, the method comprises:
displaying the object segmentation image to the user.

In some embodiments, a non-transitory computer-readable storage medium including instructions is also provided, and the instructions may be executed by a device (such as the disclosed encoder and decoder), for performing the above-described example methods (e.g., FIGS. 2, 5, and 7). Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses, all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for training an image processing model, comprising:
acquiring a sample image comprising a target object to determine an object segmentation image of the target object in the sample image;
constructing an object coordinate map corresponding to the object segmentation image according to the object segmentation image; and
training an image processing model comprising a self-attention mechanism layer according to the sample image, the object segmentation image, and the object coordinate map.

2. The method according to claim 1, wherein constructing the object coordinate map corresponding to the object segmentation image according to the object segmentation image further comprises:
extracting a sample centerline of the target object in the object segmentation image according to a preset centerline extraction algorithm;
establishing an initial coordinate map according to the object segmentation image, and determining a start point position of the sample centerline;
tracking the sample centerline from the start point position according to a preset tracking algorithm; and
constructing the object coordinate map corresponding to the object segmentation image by combining a foreground voxel in the object segmentation image and coordinates in the initial coordinate map.

3. The method according to claim 2, wherein tracking the sample centerline from the start point position according to the preset tracking algorithm, and constructing the object coordinate map corresponding to the object segmentation image by combining the foreground voxel in the object segmentation image and coordinates in the initial coordinate map further comprises:
tracking the sample centerline from the start point position according to the preset tracking algorithm, and incrementally labeling the sample centerline in the initial coordinate map;
propagating a coordinate position to the foreground voxel in the object segmentation image according to the sample centerline in the initial coordinate map; and
mapping the corresponding foreground voxel into the initial coordinate map according to the coordinate position corresponding to the foreground voxel in the object segmentation image, and constructing the object coordinate map corresponding to the object segmentation image.

4. The method according to claim 1, wherein the image processing model comprises an encoder and a decoder; and training an image processing model comprising the self-attention mechanism layer according to the sample image, the object segmentation image, and the object coordinate map further comprises:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

5. The method according to claim 4, wherein training the image processing model according to the object segmentation image, the object coordinate map, the predicted object segmentation image, and the predicted object coordinate map further comprises:

determining a first loss function formed according to the object segmentation image and the predicted object segmentation image;

determining a second loss function formed according to the object coordinate map and the predicted object coordinate map; and training the image processing model according to the first loss function and the second loss function.

6. The method according to claim 5, wherein determining the second loss function formed according to the object coordinate map and the predicted object coordinate map comprises:

obtaining the second loss function according to the object coordinate map and the predicted object coordinate map by using a first preset algorithm.

7. The method according to claim 6, wherein training the image processing model according to the first loss function and the second loss function comprises:

obtaining a target loss function according to the first loss function and the second loss function by using a second preset algorithm; and training the image processing model according to the target loss function.

8. The method according to claim 4, wherein inputting the initial sample feature map into the self-attention mechanism layer of the encoder, and learning the feature relationship between each feature and another feature in the initial feature map, to obtain the target sample feature map corresponding to the initial sample feature map further comprises:

inputting the initial sample feature map into the self-attention mechanism layer of the encoder, and down-sampling the self-attention mechanism layer to obtain a down-sampled initial sample feature map;

processing the down-sampled initial sample feature map through a multi-head self-attention mechanism in the self-attention mechanism layer, and learning a feature relationship between each feature and other features in the down-sampled initial sample feature map, to obtain a candidate sample feature map; and up-sampling the candidate sample feature map, to obtain an up-sampled target sample feature map corresponding to the initial sample feature map.

9. The method according to claim 4, wherein the self-attention mechanism layer is a global self-attention mechanism layer, and at least two global self-attention mechanism layers are provided and each of the global self-attention mechanism layers is arranged after a corresponding convolutional layer of the encoder.

10. The method according to claim 1, wherein after training the image processing model comprising the self-attention mechanism layer, the method further comprises:

receiving a to-be-processed image comprising the target object; and inputting the to-be-processed image into the image processing model, to obtain an object segmentation image of the target object in the to-be-processed image.

11. The method according to claim 10, wherein the to-be-processed image comprising the target object is a computed tomography (CT) image comprising colorectum.

12. An apparatus for training an image processing model, the apparatus comprising:

a memory configured to store instructions; and one or more processors configured to execute the instructions to cause the apparatus to perform:

acquiring a sample image comprising a target object to determine an object segmentation image of the target object in the sample image;

constructing an object coordinate map corresponding to the object segmentation image according to the object segmentation image; and training an image processing model comprising a self-attention mechanism layer according to the sample image, the object segmentation image, and the object coordinate map.

13. The apparatus according to claim 12, wherein in constructing the object coordinate map corresponding to the object segmentation image according to the object segmentation image, the one or more processors are further configured to execute the instructions to cause the apparatus to perform:

extracting a sample centerline of the target object in the object segmentation image according to a preset centerline extraction algorithm;

establishing an initial coordinate map according to the object segmentation image, and determining a start point position of the sample centerline;

tracking the sample centerline from the start point position according to a preset tracking algorithm; and constructing the object coordinate map corresponding to the object segmentation image by combining a foreground voxel in the object segmentation image and coordinates in the initial coordinate map.

14. The apparatus according to claim 13, wherein in tracking the sample centerline from the start point position according to the preset tracking algorithm, and constructing the object coordinate map corresponding to the object segmentation image by combining the foreground voxel in the object segmentation image and coordinates in the initial coordinate map, the one or more processors are further configured to execute the instructions to cause the apparatus to perform:

tracking the sample centerline from the start point position according to the preset tracking algorithm, and incrementally labeling the sample centerline in the initial coordinate map;

propagating a coordinate position to the foreground voxel in the object segmentation image according to the sample centerline in the initial coordinate map; and mapping the corresponding foreground voxel into the initial coordinate map according to the coordinate position corresponding to the foreground voxel in the object segmentation image, and constructing the object coordinate map corresponding to the object segmentation image.

15. The apparatus according to claim 12, wherein the image processing model comprises an encoder and a decoder, and in training an image processing model comprising the self-attention mechanism layer according to the sample image, the object segmentation image, and the object coordinate map, the one or more processors are further configured to execute the instructions to cause the apparatus to perform:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

16. The apparatus according to claim 15, wherein in training the image processing model according to the object segmentation image, the object coordinate map, the predicted object segmentation image, and the predicted object coordinate map, the one or more processors are further configured to execute the instructions to cause the apparatus to perform:

determining a first loss function formed according to the object segmentation image and the predicted object segmentation image;

determining a second loss function formed according to the object coordinate map and the predicted object coordinate map; and training the image processing model according to the first loss function and the second loss function.

17. A non-transitory computer readable medium that stores a set of instructions that is executable by one or more processors of an apparatus to cause the apparatus to initiate a method for training an image processing model, the method comprising:

acquiring a sample image comprising a target object to determine an object segmentation image of the target object in the sample image;

constructing an object coordinate map corresponding to the object segmentation image according to the object segmentation image; and training an image processing model comprising a self-attention mechanism layer according to the sample image, the object segmentation image, and the object coordinate map.

18. The non-transitory computer readable medium of claim 17, wherein constructing the object coordinate map corresponding to the object segmentation image according to the object segmentation image comprises:

extracting a sample centerline of the target object in the object segmentation image according to a preset centerline extraction algorithm;

establishing an initial coordinate map according to the object segmentation image, and determining a start point position of the sample centerline;

tracking the sample centerline from the start point position according to a preset tracking algorithm; and constructing the object coordinate map corresponding to the object segmentation image by combining a foreground voxel in the object segmentation image and coordinates in the initial coordinate map.

19. The non-transitory computer readable medium of claim 18, wherein tracking the sample centerline from the start point position according to the preset tracking algorithm, and constructing the object coordinate map corresponding to the object segmentation image by combining the foreground voxel in the object segmentation image and coordinates in the initial coordinate map comprises:

tracking the sample centerline from the start point position according to the preset tracking algorithm, and incrementally labeling the sample centerline in the initial coordinate map;

propagating a coordinate position to the foreground voxel in the object segmentation image according to the sample centerline in the initial coordinate map; and mapping the corresponding foreground voxel into the initial coordinate map according to the coordinate position corresponding to the foreground voxel in the object segmentation image, and constructing the object coordinate map corresponding to the object segmentation image.

20. The non-transitory computer readable medium of claim 17, wherein the image processing model comprises an encoder and a decoder; and training the image processing model comprising a self-attention mechanism layer according to the sample image, the object segmentation image, and the object coordinate map comprises:

inputting the sample image into a convolutional layer of the encoder to obtain an initial sample feature map of the sample image;

inputting the initial sample feature map into a self-attention mechanism layer of the encoder, and learning a feature relationship between each feature and another feature in the initial feature map, to obtain a target sample feature map corresponding to the initial sample feature map;

inputting the target sample feature map into the decoder for processing, to obtain a predicted object segmentation image and a predicted object coordinate map of the target object in the sample image; and training the image processing model according to the object segmentation image, the object coordinate map, the predicted object segmentation image, and the predicted object coordinate map.

* * * * *